March 7, 1961 F. A. DE PUYDT ET AL 2,973,839
AUTOMATIC BRAKE FOR TRAILER VEHICLE
Filed April 14, 1958 3 Sheets-Sheet 2
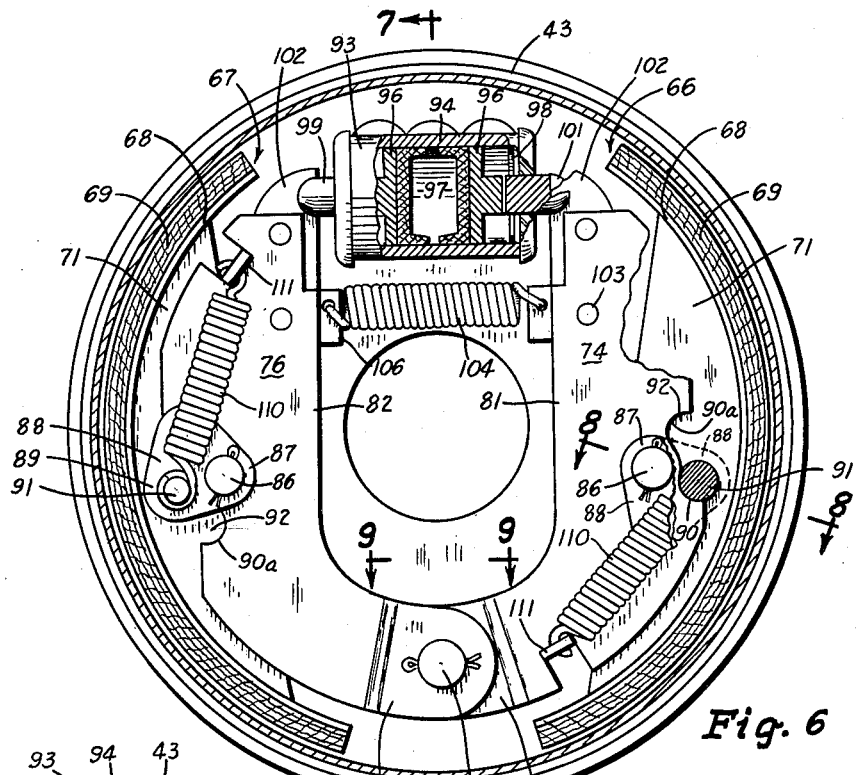
Fig. 6
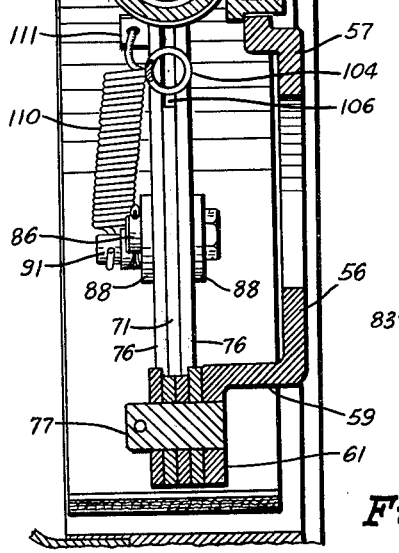
Fig. 7
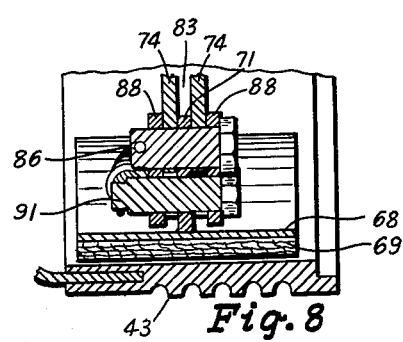
Fig. 8
Fig. 9
INVENTOR.
ROGER C. SILVER
FRANK A. DEPUYDT
BY
Lowell & Henderson
ATTORNEY

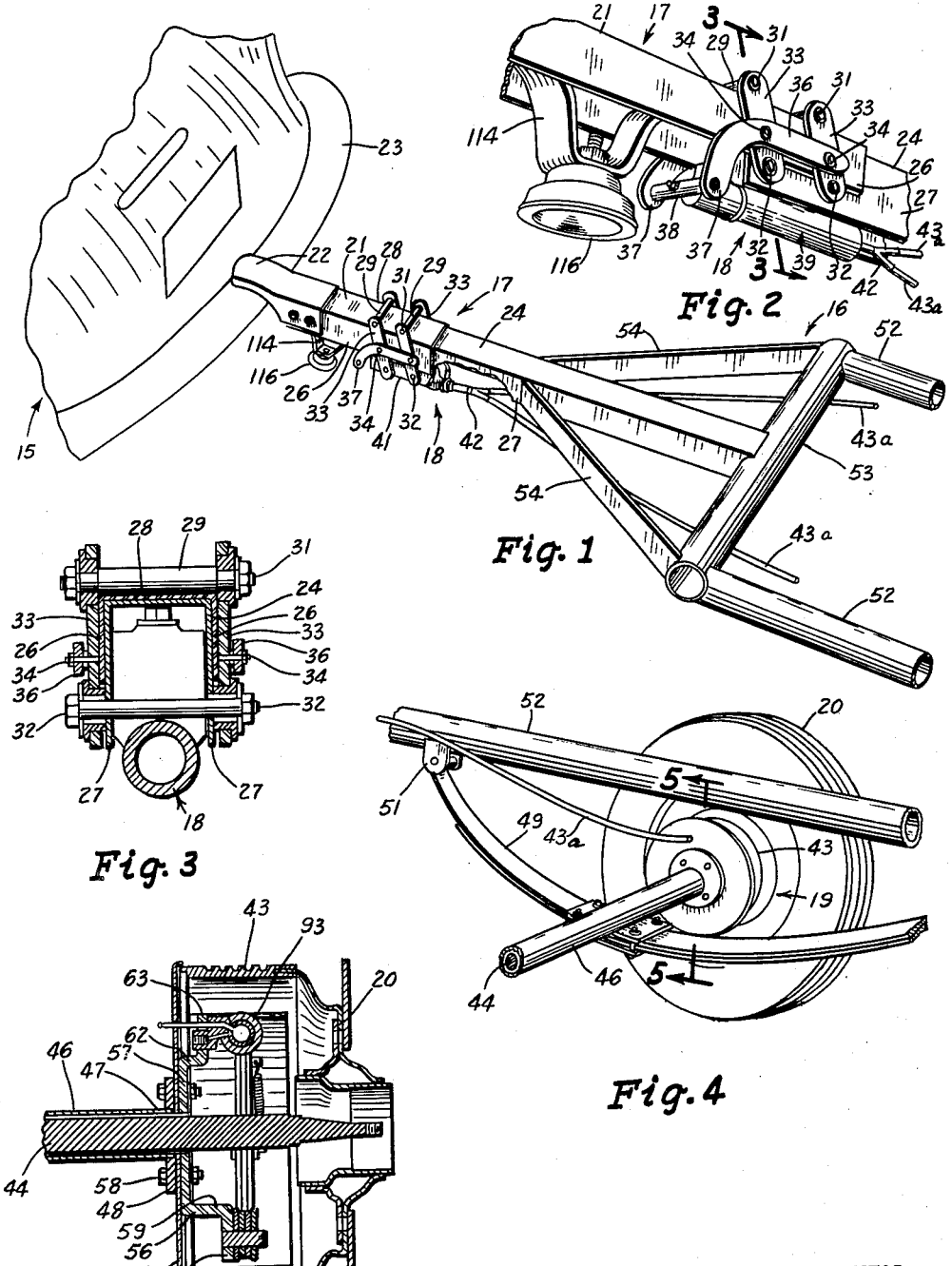

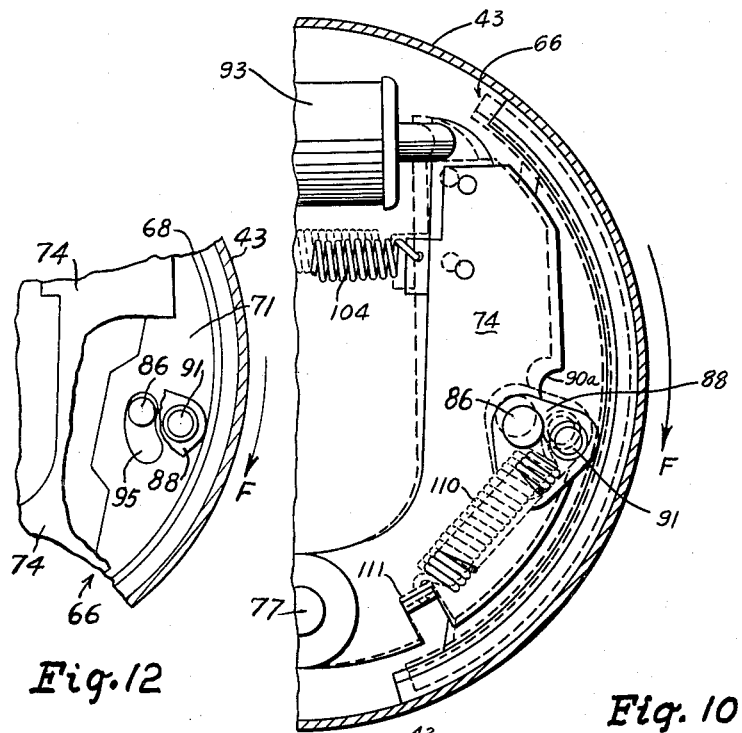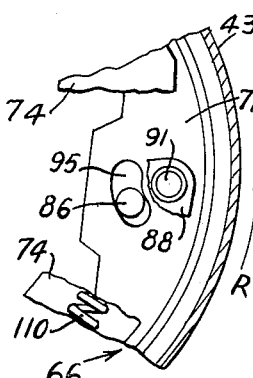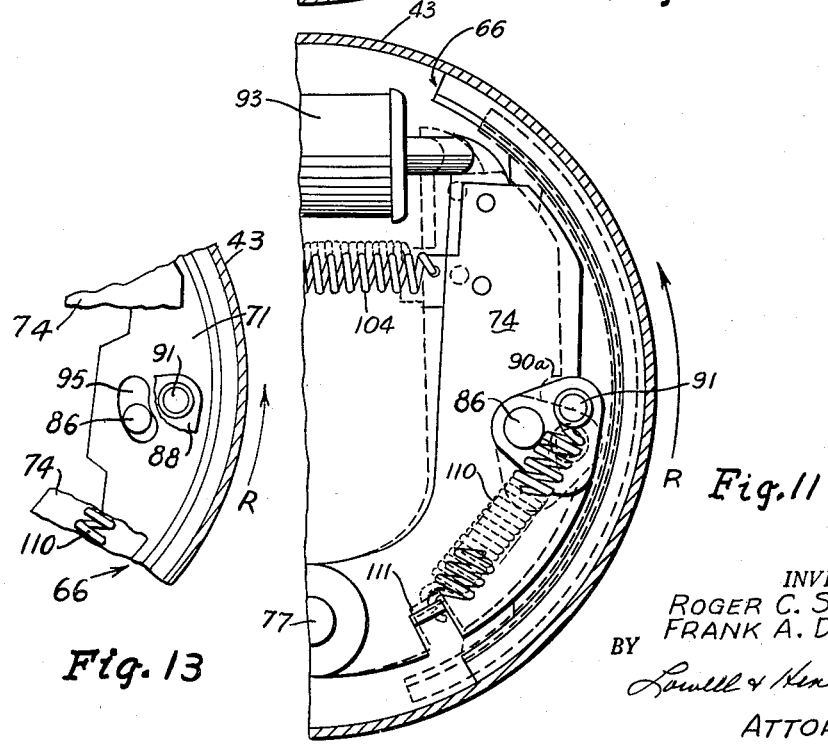

ID StaUnited States Patent Office  2,973,839
Patented Mar. 7, 1961

1

2,973,839

AUTOMATIC BRAKE FOR TRAILER VEHICLE

Frank A. De Puydt and Roger C. Silver, Des Moines, Iowa, assignors to Dico Corporation, Des Moines, Iowa, a corporation of Iowa Filed Apr. 14, 1958, Ser. No. 728,439

9 Claims. (Cl. 188—112)

This invention relates generally to vehicle brakes and in particular to the brakes for the trailer of a trailer-tractor vehicle combination which are automatically operated in response to the inertia action of the trailer on the tractor.

An object of this invention is to provide improved automatic brakes for the trailer of a tractor-trailer vehicle combination.

A further object of this invention is to provide trailer brakes which are automatically operated to brake the forward travel of the trailer and automatically rendered inoperative on any rearward movement of the trailer.

Still another object of this invention is to provide automatic trailer brakes which are actuated by relative movement between the tractor and trailer vehicles whereby to prevent the "jackknifing" of the trailer and tractor in down grade travel, or when the tractor brakes are applied.

A further object of this invention is to provide trailer brakes which operate independently of the brakes of the tractor or towing vehicle.

Yet another object of this invention is to provide an automatic brake for the trailer of a trailer-tractor combination wherein an articulated brake linkage system within the brake drum is movable to a first position to provide for a braking action against forward travel of the trailer and to a second position rendered ineffective to brake a rearward travel of the trailer.

A still further object of this invention is to provide automatic brakes for the trailer of a trailer-tractor vehicle combination which are positive and instantaneous in action, of a simple, compact and rugged construction, and efficient in operation.

Further objects, features and advantages of this invention will become apparent from the following description when taken in connection with the accompanying drawing in which:

Fig. 1 is a perspective view of the rear portion of a vehicle and the front portion of a trailer embodying the brake mechanism of this invention;

Fig. 2 is an enlarged detail perspective view of a portion of the hitch connection in the tractor-trailer combination shown in Fig. 1;

Fig. 3 is an enlarged sectional detail view taken along the line 3—3 in Fig. 2;

Fig. 4 is a fragmentary perspective view of a trailer wheel assembly embodying the brake mechanism of this invention;

Fig. 5 is a sectional view as seen on the line 5—5 in Fig. 4;

Fig. 6 is an enlarged vertical sectional view, with some parts broken away, taken transversely of the trailer wheel axle and showing a brake drum with the brake shoe linkage assembly of this invention;

Fig. 7 is a sectional view taken along the line 7—7 in Fig. 6;

Fig. 8 is a detail sectional view as seen on the line 8—8 of Fig. 6;

2

Fig. 9 is a sectional detail view taken on the line 9—9 in Fig. 6;

Figs. 10 and 11 are partial sectional views illustrated similarly to Fig. 6 and showing parts of the brake shoe linkage assembly in changed positions; and Figs. 12 and 13 are partial sectional views illustrated similarly to Figs. 10 and 11, with parts broken away and showing other parts in changed positions corresponding to the full line positions in Figs. 10 and 11, respectively.

With reference to the drawing there is illustrated in Fig. 1 a tractor vehicle 15 connected with a trailer vehicle, designated generally as 16, by means of an extensible and retractable connecting unit 17 provided with a piston and cylinder assembly 18 for supplying fluid under pressure to a brake mechanism, indicated generally at 19 in Fig. 4, for each trailer wheel 20.

The hitch or connecting unit 17 includes what might be termed a telescoping member 21 of an inverted channel shape in transverse cross section (Figs. 1, 2 and 3), having a socket member 22 at its front end for receiving the usual ball (not shown) carried on the bumper 23 of the tractor vehicle 15, which is illustrated as being an automobile. In nesting arrangement with the telescoping member 21 is the tongue 24 for the trailer 16. As best appears in Figs. 2 and 3 the telescoping member 21 is movably supported on the tongue member 24 and has its depending legs 26 of a shorter length than the legs 27 of the tongue member 24. Secured to the top section or base 28 of the telescoping member 21, and in a longitudinally spaced relation, are a pair of transversely extended tubular bearing members 29 for receiving upper shafts 31. Corresponding to the upper shafts 31 are a pair of lower shafts 32 extended through and supported on the legs 27 of the tongue member 24 at positions below the legs 26 of the telescoping member 21.

A link 33 is pivotally supported or connected between the ends of each corresponding pair of upper and lower shafts 31 and 32 so that the links are arranged on opposite sides of the connecting unit 17. Each pair of links 33, to one side of the connecting unit 17, are pivotally connected as at 34 (Figs. 1 and 2) at positions intermediate the ends thereof with a longitudinally extended lever 36 having a forwardly and downwardly curved front end 37 which terminates below the legs 26 of the telescoping member 21. A rod 38 connected between the front ends of the levers 36 is pivotally connected to the piston 39 of the cylinder assembly 18. The cylinder 41, of the assembly 18, which might be called a master cylinder, is carried on the tongue member 24 and is operatively assembled as a unit with an oil reservoir and by-pass system (not shown). A main conduit 42 fluid connects the cylinder 41 with a pair of feeder conduits 43a to supply oil under pressure to the brake mechanisms 19 for the trailer wheels 20. It is seen, therefore, that the links 33 constitute a parallel link system for effecting a linear forward and rearward movement of the levers 36 in response to a relative movement between the telescoping member 21 and the tongue member 24.

On extension of the telescoping member 21 relative to the tongue member 24, the cylinder 41 is moved rearwardly relative to the member 21 concurrently with the links 33 being moved to positions inclined upwardly and forwardly relative to the lower shafts 32, whereby the levers 36 are moved to extreme forward positions to provide for an extension of the piston 39 from its associated cylinder 41. In this condition of the connecting unit 17, no oil is supplied by the cylinder assembly 18 to the trailer brake mechanisms 19.

On retraction of the telescoping member 21 relative to the tongue member 24, the cylinder 41 is moved forwardly relative to the member 21 concurrently with the links 33 being moved to positions inclined upwardly and rearwardly relative to their shaft supports 32. During this movement of the links 33 to such upwardly and rearwardly inclined positions the levers 36 are moved rearwardly to provide for the retraction of the piston 39 within the cylinder 41, whereby to supply oil under pressure to the feeder lines 43a for application to the trailer brake assemblies 19.

It is seen, therefore, that on forward movement of the trailer relative to the tractor, the tongue member 24 moves relative to the telescoping member 21 to actuate the cylinder assembly 18 to apply oil under pressure to the trailer brake mechanisms 19. It will be apparent that such relative movement will take place, on application of the brakes of the tractor vehicle, during a towing operation, and the resultant inertia of the trailer acting on the tongue member 24.

It will also be noted that the telescoping member 21 is retracted on a rearward movement of the tractor relative to the trailer so that oil under pressure is supplied by the cylinder assembly 18 to the brake mechanisms 19, when the trailer moves forward relative to the tractor, or when the tractor moves rearwardly relative to the trailer.

A braking mechanism 19 is automatically operated in response to the retraction of the telescoping member 21 and includes a brake drum 43 (Figs. 4 and 5) rotatable with and supported on the trailer wheel 20. An axle 44 for the wheel 20 is carried in a housing 46 which has welded or otherwise secured at its end 47 a radially extended flat collar 48.

The axle housing 46 (Fig. 4) has secured thereto a semi-elliptical spring 49 which is connected through the usual shackles 51 to a longitudinally extended side frame member 52 for the trailer 16. As shown in Fig. 1 the forward ends of the side members 52 are connected to a transverse frame member 53, to which the tongue member 24 and its connecting braces 54 are secured.

Positioned within the brake drum 43 (Figs. 5 and 7) is a supporting strap or mounting bracket 56 of an irregular shape having an intermediate flat section 57 secured, as by bolts 58 to the collar 48 and having at its lower end a lateral extension 59 terminating in a depending leg or section 61. In like manner the upper end of the flat section 57 has a lateral extension 62 which terminates in an upright leg section 63. Arranged between the collar 48 and the flat section 57 of the mounting bracket 56 is a cover plate 64 for closing the inner or open side of the brake drum 43.

Operatively associated with the brake drum 43 (Fig. 6) are a pair of brake shoes 66 and 67 each of which includes an arcuate support 68 for a brake lining 69 and a flat lever or gusset plate 71 extended across the arc of the support 68. Corresponding to each brake shoe 66 and 67, is a pair of lever plates 74 and 76, respectively, with these pairs of plates being pivotally connected together at their lower ends for movement of their upper ends toward and away from each other. The pivot 77 for the lever plates 74 and 76 is secured to the lower depending leg 61 of the mounting bracket 56 so as to project inwardly of the brake drum 43 in a direction axially of the brake drum. The lever plates 74 and 76 are generally of a J-shape having their short legs 78 and 79, respectively, connected to the pivot 77 and their long legs 81 and 82, also respectively, extended upwardly.

Each lever plate 74 and 76 has the terminal end portion of its short leg offset laterally outwardly from the plane of the lever plate so that in the assembly of such levers with the pivot 77, and as best appears in Fig. 9, the terminal end portions of the short legs 78 of the levers 74 are positionable against each other and located between the terminal end portions of the short legs 79 of the levers 76 to provide for adjacent pairs of levers 74 and 76 being in substantially common planes extended transversely of the pivot 77.

It will also be noted that the lateral offset of the terminal end portions of the legs 78 and 79 of the levers 74 and 76, respectively, provides for the pair of levers 74, and the pair of levers 76, being spaced apart from each other as indicated at 83 in Fig. 9, in a direction axially of the pivot 77. Guidably received within the spaces 83 are the gusset plates 71 for corresponding brake shoes 66 and 67. Since the assembly of a gusset plate 71 with a corresponding pair of levers 74 or 76 is similar in construction and operation, only such assembly for the brake shoe 66 will be referred to in detail, with like numbers being used to designate similar parts.

Intermediate the ends of the levers 74 and carried on such levers, is a transverse pivot 86 (Figs. 6, 7 and 8) which also extends through the gusset plate 71 of the shoe 66. Pivotally supported on the pivot 86 at a position to the outer side of each lever plate 74 is one end 87 of a toggle link 88. The other ends 89 of the toggle links 88 are connected by a transverse pivot 91 with the gusset plate 71 at a position between the pivot 86 and the brake drum 43. The pivot 91 is movable within an arcuate slot or recess 92 formed in the lever plates 74, between a pair of stops 90 and 90a defined by the ends of the slot 92. As best shown in Figs. 12 and 13, the pivot 86 extends through a slot 95 formed in the gusset plate 71. It is seen, therefore, that the pivot 91, and in turn the brake shoe 66, is movable relative to the levers 74 and about the pivot 86 over an angular distance limited by the length of the slots 92. This movement of the brake shoe 66 is permitted by virtue of the movement of the pivot 86 within the slot 95 of the gusset plate 71. The assembly for the brake shoe 66 thus constitutes an articulated linkage system comprised of the levers 74 pivoted at 77, and the pivotal connection of the brake shoe 66 with the levers 74 by means of the pivoted toggle links 88.

Mounted on the upper leg 63 of the mounting bracket 56 is a cylinder assembly or fluid unit 93, operable in response to the supply of fluid under pressure thereto from the cylinder assembly 18 of the connector unit 17 (Figs. 6 and 7). The cylinder 94 of the fluid unit 93 is provided with a pair of opposed pistons 96 so that the space 97 between the pistons 96 constitutes a fluid receiving chamber, and with the movement of the pistons 96 outwardly away from each other being limited by their engagement with stop rings or member 98 located adjacent the ends of the cylinder 94. Each piston 96 has a connecting rod 99 the outer end of which is formed with a diametrically extended slot 101 (Fig. 6) for receiving therein an upright extension 102 on the levers 74, the extension 102 being positioned between the levers 74 and secured thereto as by rivets 103. A tension spring 104 is secured between ears 106 formed on the extentensions 102 and acting to bias the legs 81 and 82 of the levers 74 and 76, respectively, toward each other. It will be appreciated, of course, that this biasing action of the spring 104 on the levers 74 and 76 also functions to bias the pistons 96 of the cylinder 94 inwardly toward each other.

In the operation of the brake mechanism of this invention assume that the wheel 20 of the trailer is being rotated in a forward direction as indicated by the arrow F in Fig. 10, corresponding to a normal towing operation by the tractor vehicle 15. On extension of the telescoping member 21 relative to the tongue member 24, and as previously described, the links 33 are in positions inclined upwardly and forwardly relative to their shaft supports 32 so that the piston 39 for the cylinder assembly 18 is extended from its associated cylinder 41. As a result no oil under pressure is supplied to the fluid chamber 97 of the fluid unit 93 so that the parts of the braking mechanism are in their positions illustrated in Figs. 6 and 12, and in their dotted line positions shown in Fig. 10.

Now let it be assumed that the brakes of the tractor vehicle 15 have been applied. On the application of the tractor brakes, and due to the inertia effect of the trailer acting on the tongue member 24 and against the tractor vehicle 15, the tongue member 24 is moved forwardly relative to the telescoping member 21 to provide for a retraction of the connecting unit 17. On movement of the links 33 from upwardly and forwardly inclined positions to upwardly and rearwardly inclined positions, relative to their shaft supports 32, the levers 36 are moved rearwardly concurrently with a relative forward movement of the cylinder 41, whereby the piston 39 is moved within its associated cylinder 41 to supply oil under pressure from the cylinder assembly or fluid unit 18 to the fluid chamber 97 of the fluid unit 93. As a result the pistons 96 are move away from each other, to in turn provide for the movement of the lever legs 74 and 76 away from each other.

As best appears in Fig. 10 on movement of the levers 74 from their dotted line positions, to their full line positions, the brake shoe 66 is moved into frictional engagement with the brake drum 43. However, by virtue of the rotation of the brake dum 43 in a clockwise direction, as viewed in Fig 10, the pivot connection 91, normally biased against the slot end 90 by a spring 110, is retained at such slot end. In other words, because of the frictional engagement between the brake drum 43 and the brake shoe 66, the shoe 66 tends to move in a clockwise direction with the brake drum, but is held against movement therewith by the engagement of the pivot 91 with the slot end 90. The location of the pivot pin 91 within the slot end 90 thus constitutes a braking position for the toggle links 88 and in turn for the articulated brake linkage system. Thus, with the pivot 91 within the slot end 90, to hold the brake shoe 66 against rotation with the brake drum 43, and with movement of the shoe 66 relative to the lever arms 74 taking place by virtue of the pin 86 being movable in the slot 95, as shown in Fig. 12, outward movement of the lever arms 74 is effective to accomplish a braking action of the brake drum 43 by the shoe 66. As best appears from a consideration of Fig. 6 the slot end 90 for the toggle pivot 91 associated with the brake shoe 67, is reversely located relative to the slot end 90 for the pivot 91 associated with the brake shoe 66. This is due to the brake shoes 66 and 67 being arranged opposite each other within the brake drum 43 and the pivoted support of the levers 74 and 76 on the common pivot 77. This reversed relation of the slot ends 90 and 90a associated with the shoes 66 and 67 provides for their simultaneous operation in a similar manner.

On a release of the brakes on the tractor vehicle 15, and in response to the extension of the telescoping member 21 relative to the tongue member 24, the lever arms 74 and 76 are moved inwardly toward each other under the action of the spring 104, to in turn move the brake shoes 66 and 67 away from braking engagement with the brake drum 43. The position of the toggle link pivots 91 within the slot ends 90 is retained by the biasing action of the springs 110 which are connected between the pivot pins 91 and struck out ears 111 formed on the levers 74 and 76.

Now let it be assumed that the tractor-trailer vehicle combination is at a stand-still and that the trailer is to be "backed up" or moved rearwardly. On retraction of the telescoping member 21, resulting from movement of the tractor 15 relative to the trailer 16, oil under pressure is supplied from the master cylinder 41 to the fluid unit 93. In response to the outward movement of the pistons 96 of the fluid unit 93, to positions against the stop members 98, the levers 74 and 76 are moved away from each other in the same manner as previously described in connection with Fig. 10. However, due to the reversed rotation of the brake drum 43 as indicated by the arrow R in Fig. 11, on frictional engagement of the brake shoe 66 with the brake drum 43 the brake shoe initially moves in a counterclockwise direction with the brake drum 43, as viewed in Fig. 11. As a result of this counterclockwise movement of the brake shoe 66 the pivot connection 91 is moved against the action of the spring 110 from the slot end 90 toward the slot end 90a, and the pivot 86 is movable within the slot 95 (Fig. 13) to in turn provide for the swinging of the brake shoe 66 from its dotted line position in Fig. 11 to its full line position shown in the same figure, out of effective braking engagement with the brake drum 43.

The brake shoes 66 and 67 are thus rendered ineffective for braking a rearward travel of the trailer, and with such ineffectiveness being maintained directly in response to the rearward rotation of the drum 43. Stated otherwise the brake shoes 66 and 67, during a rearward travel of the trailer, will frictionally engage the brake drum, but such engagement will be insufficient to accomplish any braking action. It will be noted that this frictional engagement is counteracted by the pressure of the spring 110. The location of the toggle link pivots 91 out of the slot ends 90 thus defines a non-braking position for the links 88 and in turn for the articulated brake linkage system.

On the cessation of rearward travel of the trailer 16, and the resultant extension of the connecting unit 17, the levers 74 and 76 are returned to their inward positions by the spring 104, and the pivots 91 are returned to positions against the slot ends 90, by the action of the springs 110.

It will be seen, therefore, that during a forward towing operation by the tractor vehicle 15, application of the tractor brakes will automatically set into operation the brake mechanisms 19 for the trailer vehicle 16, and with such actuation of the trailer brakes taking place independly of the tractor brakes. Also on rearward travel of the trailer 16 the brake mechanisms 19 are immediately made ineffective for braking purposes in direct response to a rearward rotation of the brake drums 43.

To provide for the automatic application of the trailer brakes in the event the trailer 16 should become accidentally disconnected from the tractor vehicle 15, during a towing operation, the telescoping member 21 is provided with a depending safety leg 114 (Fig. 1) having a rubber or like resilient pad 116 at its lower end. Thus, on disconnection of the hitch member 22 from the tractor 15 and the consequent falling downwardly of the tongue member 24, the safety leg 116 is engaged by the ground so as to provide for a retraction of the telescoping member 21 relative to the tongue member 24. This retraction of the connecting unit 17 automatically provides for the application of the trailer brakes in all ways similar to the operation previously described in connection with Fig. 10.

Although the invention has been described with respect to a preferred embodiment thereof, it is to be understood that it is not to be so limited since changes can be made therein which are within the full intended scope of this invention as defined by the appended claims.

We claim:

1. In a tractor and trailer vehicle combination having a retractable and extensible connecting element between the two vehicles and wherein a trailer wheel is rotatably carried on a supporting unit, a braking mechanism for the trailer wheel including a brake drum, a pair of brake shoes operatively associated with said brake drum, a pair of pivoted levers within said brake drum corresponding to said shoes, means on said supporting unit pivotally supporting said levers at one of their ends for movement of the other ends thereof toward and away from said brake drum, link means movably connecting each brake shoe with a corresponding lever, said link means being movable to positions providing for the movement of said shoes into and out of braking engagement with said brake drum, a fluid cylinder assembly connected between said other ends of the levers and extendable to move said other ends away from each other, and a second fluid cylinder assembly on said connecting element for supplying fluid under pressure to said first cylinder assembly in response to the action of inertia of the trailer transmitted to the tractor through said connecting element, said links, on extension of said first cylinder assembly, during forward travel of said trailer, providing for the movement of said brake shoes into braking engagement with said brake drum, and said link means, on extension of said first cylinder assembly during a rearward travel of said trailer, providing for the movement of said brake shoes out of effective braking engagement with said brake drum.

2. In a tractor and trailer vehicle combination having a retractable and extensible connecting element between the two vehicles, a braking mechanism for a wheel of the trailer including a wheel supported brake drum, a mounting within said brake drum, a pair of hinged levers within said brake drum pivotally connected together at one of their ends on said mounting for movement of the opposite ends thereof toward and away from said brake drum, fluid cylinder means for moving said opposite ends away from each other, means on said connecting element for supplying fluid under pressure to said cylinder means in response to relative movement between said two vehicles, a pair of brake shoes corresponding to said levers adapted for braking engagement with said brake drum, a toggle link movably connected with each of said brake shoes and a corresponding lever, means for limiting the movement of said toggle links relative to said levers and shoes between two stop positions, said links in a first stop position therefor and on the supply of fluid under pressure to said cylinder means providing for the movement of said shoes into braking engagement with said brake drum when said wheel is rotated in a forward direction, and in a second stop position therefor and on the supply of fluid under pressure to said cylinder means providing for the movement of said brake shoes out of effective braking engagement with the brake drum, when said wheel is rotated in a rearward direction.

3. In a tractor and trailer vehicle combination having a retractable and extensible connecting element between the two vehicles and wherein a trailer wheel is rotatably carried on a supporting unit, a braking mechanism for said wheel having a brake drum, a lever within said brake drum pivoted at one end on said supporitng unit, pivot means for said lever extended transversely of said wheel, means responsive in operation to the retraction of said connecting element for pivotally moving the other end of said lever toward said brake drum, a brake shoe for said brake drum, and a toggle link movably connecting said brake shoe and lever, said link being movable between a pair of positions relative to said lever and shoe, whereby on movement of the lever toward said brake drum, on a forward movement of said trailer relative to the tractor, said brake shoe is moved by the brake drum into braking engagement therewith concurrently with movement of said link to a first one of said pair of positions, and on movement of said lever toward said brake drum, on a rearward movement of the tractor relative to said trailer, said brake shoe is moved by the brake drum out of effective braking engagement therewith concurrently with the movement of said link to the second one of said pair of positions.

4. In a tractor and trailer vehicle combination having a retractable and extensible connecting element between the two vehicles and wherein a trailer wheel is carried on a supporting unit, a braking mechanism for the trailer wheel including a brake drum, a pair of brake shoes operatively associated with said brake drum, a pair of levers corresponding to said brake shoes, said levers having one of their ends pivotally mounted on said supporting unit, a toggle link movably connected to each lever and a corresponding brake shoe, said toggle links being movable between a pair of stop positions therefor, a fluid unit connected between the other ends of said levers and extensible on the supply of a fluid under pressure thereto to move said other ends away from each other whereby to move said brake shoes into frictional engagement with said brake drum, and a fluid assembly on said connecting element operable in response to retraction of said connecting element to supply fluid under pressure to said fluid unit, said toggle links in one of said stop positions therefor providing for the movement of said shoes into braking engagement with said brake drum to brake a forward rotation of said wheel, and in the second position therefor providing for the movement of said shoes out of effective braking engagement with said brake drum, during a rearward rotation of said wheel.

5. In a tractor and trailer vehicle combination having a retractable and extensible connecting element between the two vehicles and wherein a trailer wheel is carried on a supporting unit, a braking mechanism for the trailer wheel including a rotatable brake drum, a brake shoe for said brake drum, a pivoted lever for said brake shoe pivotally mounted on said supporting unit, a linkage means movably connected to said lever and brake shoe, an extensible and retractable fluid unit connected to said lever and operable on extension thereof to move said brake shoe into frictional engagement with said brake drum, and a fluid assembly on said connecting element fluid connected with said fluid unit to supply fluid under pressure thereto in response to a retraction of said connecting element, with said linkage means, on retraction of said connecting element during a forward travel of the vehicle combination, providing for the movement of said brake shoe into braking engagement with said brake drum to brake the forward travel of said trailer wheel and, on retraction of said connecting element during a rearward travel of the vehicle combination, providing for the movement of said brake shoe out of effective braking engagement with said brake drum.

6. In a trailer and tractor vehicle combination having a retractable and extensible connecting element between the two vehicles, a braking mechanism for a wheel of said trailer, an axle for said wheel supported in an axle housing, a brake drum rotatable with said wheel, a pair of levers within said brake drum, a pivot for pivotally connecting together one of the ends of said levers, said pivot being supported from said housing and extended longitudinally of said axle, a fluid cylinder assembly connected between the other ends of said levers, a pair of brake shoes corresponding to said levers, a toggle link connection between each lever and a corresponding brake shoe, biasing means for normally holding said toggle links in a first position therefor, and a second fluid cylinder assembly on said connecting element operable in response to retraction of said connecting element to supply fluid under pressure to said first fluid assembly to move the other ends of said levers away from each other to provide for the movement of said brake shoes into frictional engagement with said brake drum, with said frictional engagement acting to maintain said toggle links in said first position on a forward rotation of said wheel to provide for a braking engagement of said shoes with said brake drum, and on a rearward rotation of said wheel acting to move said toggle links out of said first position and to a second position providing for the release of said shoes out of effective braking engagement with said brake drum.

7. In a trailer and tractor vehicle combination having a retractable and extensible connecting element between the two vehicles and wherein a trailer wheel is rotatably carried on a supporting unit, a braking mechanism for the trailer wheel including a brake drum on said wheel, a pair of levers within said brake drum, said levers being pivoted together at one of the ends thereof on a pivot carried on said supporting unit and extended transversely of said wheel, a fluid cylinder assembly connected between the other ends of said levers, a pair of brake shoes corresponding to said levers, a toggle link having movable pivotal connections with a lever and with a corresponding brake shoe, with the pivot connection of a toggle link and a brake shoe being movable relative to a corresponding lever, and the pivot connection of a toggle link and a lever being movable relative to a corresponding brake shoe, whereby to provide for the movement of said toggle link to braking and non-braking positions for said brake shoe, means for yieldably holding said toggle links in said braking positions therefor, and a second fluid cylinder assembly on said connecting element operable in response to a retraction of said connecting element to supply fluid under pressure to said first cylinder assembly to move said brake shoes against said brake drum, with said shoes acting to brake a forward rotation of said wheel when said toggle links are in braking positions, and with said toggle links being moved to non-braking positions for said shoes on frictional engagement of said shoes with said brake drum on a rearward rotation of said wheel.

8. In an automatic brake system for the trailer of a trailer-tractor vehicle combination and wherein a trailer wheel is rotatably carried on a supporting unit, a rotary brake drum rotatable with said wheel, a brake shoe within the brake drum adapted for braking engagement therewith, a pivoted lever within said brake drum, a pivot mounting for said lever carried on said supporting unit and extended transversely of said wheel, a link having movable pivot connections with said lever and brake shoe, fluid pressure means for actuating said lever to move said brake shoe into frictional engagement with said brake drum, and means for supplying fluid under pressure to said fluid pressure means in response to the action of inertia of said trailer on said tractor, with said link connection being movable to a first position to provide for a braking engagement of said brake shoe with the brake drum during a forward travel of said trailer and movable to a second position to render said brake shoe inoperative for effective braking engagement with said brake drum during a rearward travel of said trailer.

9. In an automatic brake system for the trailer of a trailer-tractor combination and wherein a trailer wheel is rotatably carried on a supporting unit, a rotary brake drum rotatable with said wheel, an articulated brake linkage mounted on said supporting unit and located within the brake drum and including a brake shoe adapted for braking engagement with said drum, fluid pressure means for actuating said linkage to move said brake shoe into frictional engagement with said brake drum, and means for supplying fluid under pressure to said fluid pressure means in response to the action of inertia of said trailer on said tractor, with said linkage being movable to a first position in response to the frictional engagement of said brake shoe with said brake drum to provide for a braking engagement of said brake shoe with said brake drum to brake a forward travel of said trailer, and movable to a second position, in response to the frictional engagement of the brake shoe with said brake drum when the trailer is being moved rearwardly, to render said brake shoe ineffective for braking engagement with said brake drum.

References Cited in the file of this patent

UNITED STATES PATENTS

| | | |
|---|---|---|
| 1,350,318 | Lawrence | Aug. 24, 1920 |
| 1,518,357 | Ritter | Dec. 24, 1924 |
| 1,921,161 | Iversen | Aug. 8, 1933 |
| 1,966,670 | Klammer et al. | July 17, 1934 |
| 2,221,929 | Snider | Nov. 19, 1940 |
| 2,320,585 | Gill et al. | June 1, 1943 |
| 2,737,265 | Cushman | Mar. 6, 1956 |
| 2,846,030 | Wade | Aug. 5, 1958 |